(12) United States Patent
Lei et al.

(10) Patent No.: US 10,719,743 B2
(45) Date of Patent: Jul. 21, 2020

(54) LICENSE PLATE READER USING OPTICAL CHARACTER RECOGNITION ON PLURAL DETECTED REGIONS

(71) Applicant: Arcules Inc., Irvine, CA (US)

(72) Inventors: Howard Lei, Irvine, CA (US); Edwin Heredia, Irvine, CA (US)

(73) Assignee: Arcus Holding A/S, Brøndby (DK)

( * ) Notice: Subject to any disclaimer, the term of this patent is extended or adjusted under 35 U.S.C. 154(b) by 70 days.

(21) Appl. No.: 15/964,783

(22) Filed: Apr. 27, 2018

(65) Prior Publication Data

US 2019/0228276 A1    Jul. 25, 2019

Related U.S. Application Data

(60) Provisional application No. 62/619,150, filed on Jan. 19, 2018.

(51) Int. Cl.
| | |
|---|---|
| *G06K 9/72* | (2006.01) |
| *G06K 9/46* | (2006.01) |
| *G06K 9/32* | (2006.01) |
| *G06K 9/62* | (2006.01) |
| *G06N 3/08* | (2006.01) |

(52) U.S. Cl.
CPC ............. *G06K 9/72* (2013.01); *G06K 9/3258* (2013.01); *G06K 9/4628* (2013.01); *G06K 9/6261* (2013.01); *G06K 9/6274* (2013.01); *G06N 3/08* (2013.01); *G06K 2209/01* (2013.01); *G06K 2209/15* (2013.01)

(58) Field of Classification Search
CPC ...... G06K 9/72; G06K 9/3258; G06K 9/4628; G06K 9/6261; G06K 9/6274; G06N 3/08
See application file for complete search history.

(56) References Cited

U.S. PATENT DOCUMENTS 10,423,827 B1 *   9/2019   Wu .......................... G06K 9/66
2005/0084134 A1   4/2005   Toda

OTHER PUBLICATIONS

Asis Kumar Tripathy et al "Optical Character Recognition using Artificial Neural Network" IEEE 2017. (Year: 2017).*
Christian Bartz et al "STN-OCR: A single Neural Network for Text Detection and Text Recognition" IEEE 2017. (Year: 2017).*
Roh Myung-Cheol et al., "Refining faster-RCNN for accurate object detection", 2017 Fifteenth IAPR International Conference on Machine Vision Applications, (MVA), pp. 514-517, Nagoya, Japan, May 8-12, 2017.

(Continued)

*Primary Examiner* — Leon Flores
(74) *Attorney, Agent, or Firm* — Canon U.S.A., Inc. IP Division

(57) ABSTRACT

A license plate reader uses a neural network to determine a plurality of predicted license plate regions within an image. The plurality of predicted license plate regions is transferred to an optical character recognition unit that performs optical character recognition on the plurality of predicted license plate regions to output a plurality of predicted character sequences. The license plate reader receives the output of the optical character recognition unit that contains the plurality of predicted character sequences and analyzes the plurality of predicted character sequences to determine a best estimate for a character sequence in the image.

20 Claims, 9 Drawing Sheets

(56) References Cited

OTHER PUBLICATIONS

International Search Report and Written Opinion issued in corresponding International Application No. PCT/EP2019/051072 dated Mar. 28, 2019.
"On the Parallelization of Closed-set Patterns Classification for an Automatic License Plate Recognition System", Al-Shami, et al., IEEE, Proceedings for an International Conference on Sensors, Networks, Smart and Emerging Technologies (SENSET), Sep. 2017.
"Algorithmic and Mathematical Principles of Automatic Number plate Recognition Systems", Ondrej Martinsky, B.SC. Thesis, BRNO University of Technology, 2007.
"License Plate Recognition From Still Images and Video Sequences: A Survey", C.E. Anagnostopoulos et al., IEEE Transactions on Intelligent Transportation Systems, vol. 9, No. 3, Sep. 2008.
"Faster R-CNN: Towards Real-Time Object Detection with Region Proposal Networks", Shaoqin Ren et al., Cornell University ArXiv (eprint arXiv: 1506.01497), Jan. 6, 2016.

\* cited by examiner

LICENSE PLATE READER USING OPTICAL CHARACTER RECOGNITION ON PLURAL DETECTED REGIONS

BACKGROUND OF THE INVENTION

Field of the Invention

The present invention is directed to a license plate reader and method and, more specifically, to reading a license plate by identifying a region of an image that includes a license plate and performing optical character recognition for the region.

Description of Related Art

Several types of systems are known that use image processing algorithms to detect license plates and read their code values.

U.S. Patent Publication 20050084134 A1 describes a system for license plate recognition that focuses on combining image-derived, voice-derived, and manually-entered license plate numbers for license plate character recognition at mobile stations. Any known algorithm can be used to convert the license-plate image to text, but voice-derived characters override the image-derived characters, and manually-entered license plate characters override the characters entered using the other methods. The recognized characters are then compared to a database of license plate numbers, and a match is determined based on a user-defined metric.

Other types of systems are discussed in an article by C. E. Anagnostopoulos et al. entitled "License Plate Recognition from Still Images and Video Sequences: A Survey", published in IEEE Transactions on Intelligent Transportation Systems, 9(3), September 2008. That article provides a survey of classical approaches for license plate recognition based on first extracting the license plate region, followed by recognition of each character within the region. Several techniques for extracting the license plate region are discussed: Binary Image Processing, Gray-Level Processing, Color Processing, along with statistical classifiers such as cascade classifiers, Support Vector Machines (SVMs), CAMShift, genetic programming (GP), and genetic algorithms (GA), artificial neural networks (ANNs), and convolutional neural networks (CNNs).

Another system is discussed in a thesis by O. Martinsky, entitled "Algorithmic and Mathematical Principles of Automatic Number Plate Recognition Systems" (Brno University of Technology, B. SC. Thesis, Brno, 2007). That thesis discusses a simple approach for license plate region detection, followed by a neural network for character recognition.

Still another system is discussed in an article by Salah Al-Shami et al. entitled, "On the Parallelization of Closed-set Patterns Classification for an Automatic License Plate Recognition System," published by IEEE in the proceedings for an International Conference on Sensors, Networks, Smart and Emerging Technologies (SENSET), September 2017. That article discusses increasing the speed of a classification-based license plate recognition system by using parallel processing.

However, prior art approaches have not provided the desired combination of license plate region detection speed, license plate region detection accuracy, and the ability to process images in a wide range of conditions (such as blurred images, varying light exposure, etc.).

Accordingly, an improved license plate reader and method is desired that provides improved performance to quickly and accurately detect a sequence of characters on a license plate in an image.

SUMMARY OF THE INVENTION

The approach to license plate recognition described herein uses three steps: detecting candidate regions in an image that attempt to enclose license plate characters (i.e. predicted license plate regions), recognizing the characters in the detected regions (i.e., predicted character sequences), and automatically analyzing the results to generate the best estimate of a character sequence in the image.

The preferred embodiment of the present invention uses a Deep Learning method called Faster-RCNN (Region-based Convolutional Neural Network) for the first step, i.e., recognizing and detecting license plate regions within an image. The Faster-RCNN framework uses a convolutional neural network (CNN) and is designed to automatically recognize the locations of object(s) within an image using only the original image itself. In the present case, the Faster-RCNN framework has been adapted to recognize a possible location of a license plate in the image and to provide multiple predicted license plate regions. The Faster-RCNN framework is discussed in an article by Shaoqin Ren et al. entitled "Faster R-CNN: Towards Real-Time Object Detection With Region Proposal Networks," Cornell University ArXiv (eprint arXiv:1506.01497), Jan. 6, 2016, which is incorporated herein by reference.

For the second step, Optical Character Recognition (OCR) is performed on the multiple predicted license plate regions for an image. Finally, as the third step, the results of the OCR on those multiple regions are automatically analyzed to determine a best estimate of the character sequence in the image (i.e., the character sequence on a license plate in the image).

More specifically, according to one aspect the present invention provides a license plate reader including at least one memory storing instructions; and at least one processor that, upon executing instructions stored in the memory, controls the license plate reader to perform the functions of receiving an image; determining a plurality of predicted license plate regions within the received image; transferring the plurality of predicted license plate regions to an optical character recognition unit that performs optical character recognition on the plurality of predicted license plate regions to output a plurality of predicted character sequences; receiving the output of the optical character recognition unit that contains the plurality of predicted character sequences; and analyzing the plurality of predicted character sequences to determine a best estimate of a character sequence in the image. (That is, determine a character sequence that is most likely to be the actual character sequence on the license plate in the original image.).

According to another aspect, the present invention provides a license plate reader including a neural network that determines a plurality of predicted license plate regions within an image; and a controller that controls the license plate reader to (i) transfer the plurality of predicted license plate regions to an optical character recognition unit that performs optical character recognition on the plurality of predicted license plate regions to output a plurality of predicted character sequences, (ii) receive the output of the optical character recognition unit that contains the plurality of predicted character sequences, and (iii) analyze the plurality of predicted character sequences to determine a best estimate for a character sequence in the image.

According to still another aspect, the present invention provides a method for reading a license plate that includes receiving an image; determining a plurality of predicted license plate regions within the received image; transferring the plurality of predicted license plate regions to an optical character recognition unit that performs optical character recognition on the plurality of predicted license plate regions to output a plurality of predicted character sequences; receiving the output of the optical character recognition unit that contains the plurality of predicted character sequences; and analyzing the plurality of predicted character sequences to determine a best estimate for a character sequence in the received image.

These and other aspects of the present invention will be explained below with respect to the preferred embodiments.

DESCRIPTION OF THE PREFERRED EMBODIMENTS

In the past five years, Deep Learning methods have been developed to perform image object recognition and detection of object boundaries. Research shows that Deep Learning methods over time can easily surpass traditional methods in terms of recognition/detection performance.

In the preferred embodiment, the present invention uses the Faster-RCNN deep learning framework to make one or more predictions of the license plate region within an image, which are typically overlapping regions. In the preferred embodiment, the plural predicted license plate regions are then combined, i.e., stitched together, into a single image, and the single image is sent to an OCR engine or unit. The OCR unit recognizes characters in the combined image and outputs results that include multiple subsets of recognized characters that correspond to different predicted license plate regions. (Some predicted license plate regions may not have a corresponding recognized character sequence, if no characters were successfully recognized in that region). The various subsets of recognized characters are then analyzed to determine a sequence of characters that is the best estimate of the character sequence on a license plate in the original image. In the preferred embodiment, the best estimate is determined by selecting a character sequence that appears most often in the output results of the OCR as the character sequence of the license plate.

An example of a process for reading a license plate from an image in accordance with the preferred embodiment will be described with respect to the flow diagram in FIG. 1.

Figure 1:
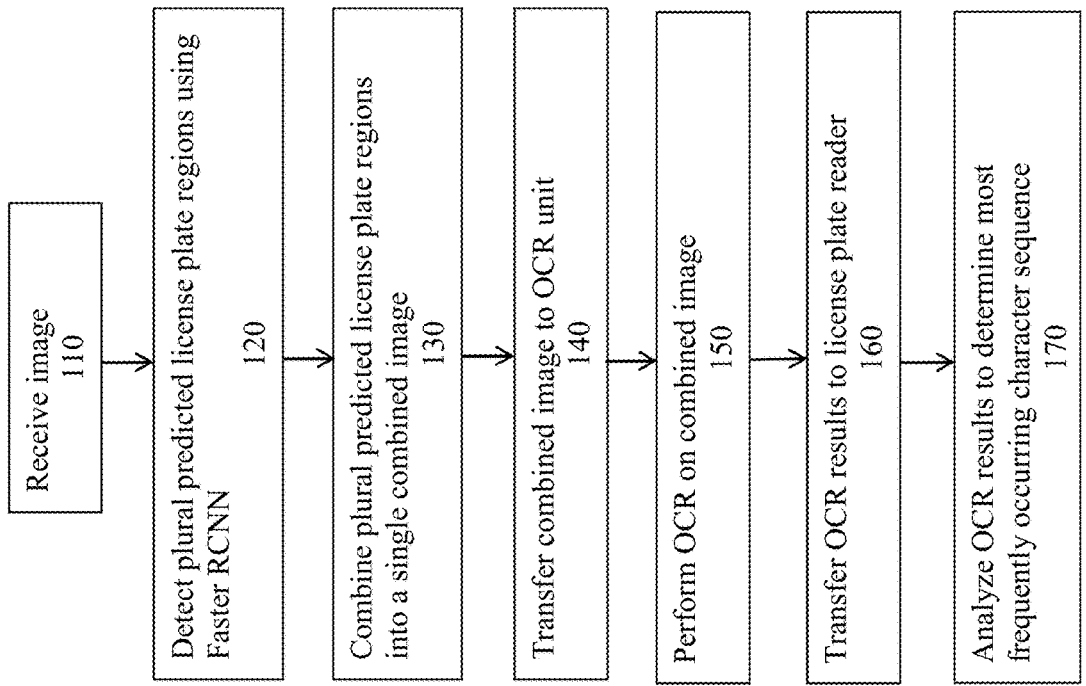
FIG. 1 shows a flow chart of a process for reading a license plate according to a preferred embodiment of the invention.

In FIG. 1, the license plate reader receives an image in step 110. The image can be received from any known image capture device, including various types of cameras and image sensors. The image may be captured by a separate device and transferred to the license plate reader or, alternatively, the image capture device may be integrated with the license plate reader and received via an internal connection (for example, a data bus).

In step 120, the Faster-RCNN framework is used to detect a plurality of predicted license plate regions 1 to N. An important feature of the Faster-RCNN object detection network is that during the process of finding objects that look like license plates in an image, it can generate multiple region predictions, where each predicted region is usually slightly different from the other predicted regions.

Each predicted region defines the boundaries for an object that resembles a license plate. However, even if there is a single license plate in the image, the neural network is configured to predict a number of regions with slightly different boundaries, all usually centered around the true target object (i.e., the actual license plate region in the image). In particular, the Faster-RCNN framework includes a parameter called IoU (Intersection-over-union) threshold for NMS (Non-Maximum Suppression) that is set to a value of 1.0, which maximizes the number of predicted license plate regions and allows the framework to generate multiple predicted license plate regions corresponding to a single instance of a license plate in the image. In contrast, those skilled in the art will recognize that, in conventional object recognition applications, the goal is to recognize a single region in an image that is believed to be the location of an object to be detected. (If multiple instances of the object occur in the image, then multiple regions might be identified, but the goal is still a single predicted region for each instance of the object.)

Also, while the preferred embodiment uses the Faster-RCNN framework, those skilled in the art will appreciate that other types of neural networks could be used, such as, for example, neural networks based on SSD (single-shot detection) or YOLO (you only look once). In addition, one skilled in the art would understand that these baseline frameworks can be modified if necessary for a particular application.

Some of the predicted regions will enclose only the license plate code values (i.e., characters of the license plate number itself), but other predicted regions may enclose additional parts of a license plate and its surrounding area. For example, predicted regions having larger boundaries or shifted up or down with respect to the center of the actual license plate region may include additional text such as the state name that appears at the bottom of U.S. license plates, and/or the text that appears in decorated license plate frames that car owners often use.

The purpose of a license plate recognition system is to extract the actual license plate value from an image with high accuracy. However, the presence of additional text in predicted regions can complicate the procedure and reduce accuracy. OCR units can easily generate errors due to the extra text. This is one of the primary challenges in providing an accurate license plate reader. Additional text may include, for example, a state name (such as "California") above or below the license plate number, a state motto (such as "The Golden State") on the license plate, and/or characters relating to an expiration date of the registration (such as "APR" indicating the month of expiration and/or "19" indicating the year of expiration). In addition, a license plate holder may have a rim surrounding the license plate that also contains text (such as "Ohio University" and/or "Alumni") All of that extra text behaves like noise that may inhibit accurate extraction of the actual character sequence. For example, if the actual license plate number is "6GBP596," due to the extra text on or near the license plate the OCR may output sequences like "APR 6GBP" or "GBP596 19." Other possible sources of noise are shadows that may obscure some characters, and the orientation of the camera with respect to the license plate. By performing OCR using a plurality of predicted license plate regions, the effects of this noise can be reduced to provide a more accurate and reliable license plate reader Accordingly, the preferred embodiment determines multiple predicted license plate regions and, after OCR is performed on the multiple regions, analyzes the results to determine a best estimate of the real license plate values and discard misleading text entries. In the preferred embodiment, the multiple predicted license plate regions are combined into a single combined image to be transferred to an OCR unit.

Accordingly, in step 130 of FIG. 1, in the preferred embodiment, the predicted regions computed by the neural network are combined into a single image. The combined image is then sent to an OCR unit for character recognition.

In the preferred embodiment, the plural predicted regions are stitched together vertically. One skilled in the art would understand that other configurations of the combined image are possible.

Furthermore, it would be possible to send each predicted region to the OCR unit individually. However, the transfer of an image takes time and resources, particularly when the OCR unit is located remotely and the transfer takes place over a network. Each individual request to an OCR unit via a network requires a fixed network data transfer time, so combining the regions into a single image allows for only one request to be made to an OCR unit and reduces the network data transfer time. Therefore, combining the predicted regions into a single image so that only one image must be transferred to the OCR unit provides advantages with respect to improved speed and reduced load on system resources used in managing transfers over a network.

In step 140 of FIG. 1, the preferred embodiment transfers the single image comprising the combination of predicted license plate regions 1 to N to an OCR unit, and in step 150 the OCR unit performs OCR on the combined image and outputs M predicted character sequences. Note that M does not necessarily equal N, because a character sequence corresponding to each predicted region may not be output by the OCR unit (giving M<N), or additional character sequences may be output by the OCR unit corresponding to the additional text on a license plate other than the license plate number (giving M>N).

In the preferred embodiment, the combined image is transferred via the Internet to Google's OCR engine, which is a service that Google operates in the cloud. Images are submitted to the service by users, the service recognizes any text in the images, and the results are sent back to the user.

One skilled in the art will understand that it is not necessary to use Google's OCR engine, and it is not necessary to use a remote OCR unit to which the combined image is transferred via the Internet. The combined image can be transferred to an OCR unit via a local area network, a direct connection, or some other means. However, the leveraging of Google's publicly available, cloud-based OCR engine in preferred embodiment provides certain benefits, such as ease of use. The use of Google's OCR engine may also provide benefits in accuracy and speed of the optical character recognition. Moreover, Google's OCR is easier and more available for use by a broad range of audiences compared to the related art. The final license plate character recognition obtained from Google's OCR is improved upon in this preferred embodiment by stitching together multiple predicted regions obtained using the Faster-RCNN framework before performing the OCR.

In step 160 of FIG. 1, the OCR unit transfers the OCR results back to the license plate reader, and then in step 170 of the preferred embodiment the license plate reader analyzes the output from the OCR unit. Each license plate region within the stitched together image can cause the OCR unit to produce a different character recognition output, although as noted above not every predicted region necessarily has a corresponding recognized character sequence. All of the recognized character sequences appear in a single final OCR output, and the license plate reader analyzes those character sequences to select a best estimate for the character sequence. In one preferred approach, the OCR output results are analyzed to determine which character sequence appears most frequently in the OCR output results. The most frequently-occurring character sequence in the OCR output results is selected as the best estimate of the character sequence, and that character sequence is used as the recognized license plate character sequence. This is an example of a statistical approach. Alternatively, the best estimate can be selected by analyzing the OCR output results while taking into account known character patterns in license plates. For example, the analysis may take into account an expected number of characters in the license plate number, and/or the fact that only numerical digits 0 to 9 and alphabet letters A to Z are expected (if such parameters are not already utilized in the OCR itself). Other rules and methods could also be used to obtain the best estimate, including other statistical methods, pattern recognition methods, or supplementary machine learning methods that could be trained to determine the best estimate of an actual license plate number.

Figure 2:
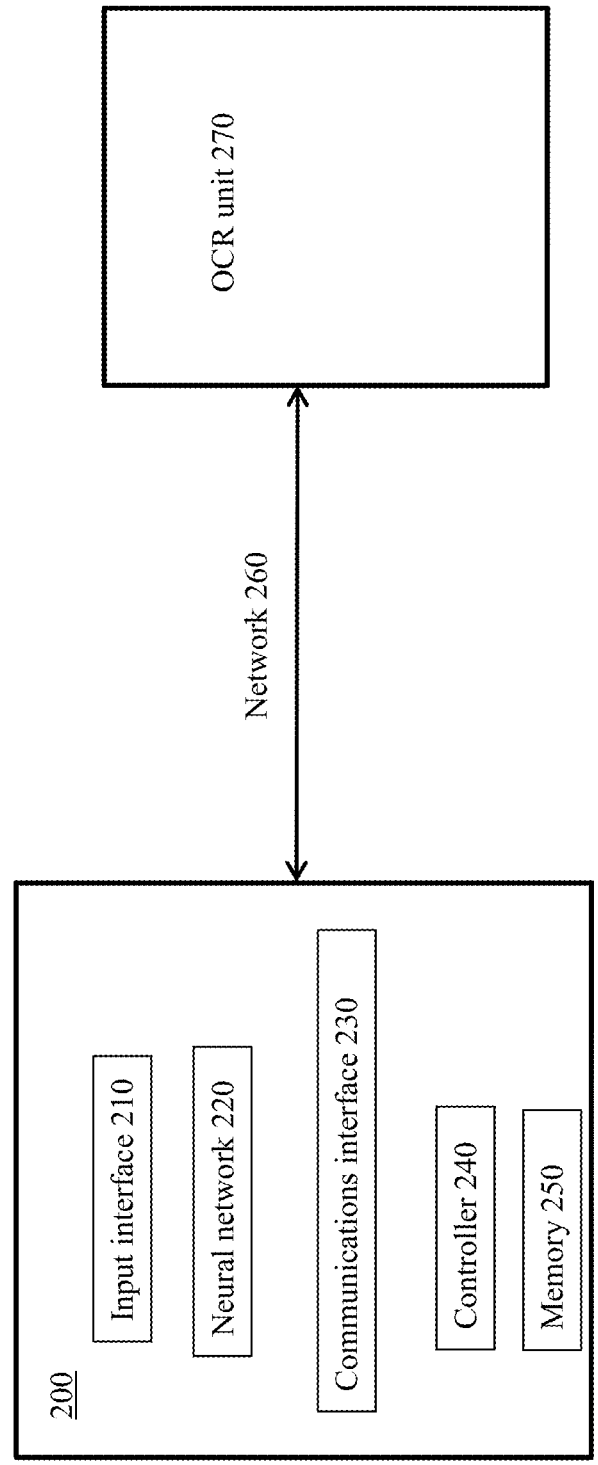
FIG. 2 shows a block diagram of an arrangement of hardware components of a license plate reading system according to the preferred embodiment of the invention.

FIG. 2 shows a block diagram of the basic hardware elements of the preferred embodiment. A license plate reader 200 includes an input interface 210 for receiving an image, a neural network 220 that performs the Faster-RCNN deep learning framework to obtain plural predicted license plate regions, and a communications interface 230 to transfer the combined image to the OCR unit. One skilled in the art would understand that a controller 240 is used to control the operations of the other components and perform combination of the multiple predicted regions into a combined image and analysis of the OCR results to determine the most frequently occurring recognized character sequence. One skilled in the art would also understand that memory 250 (which may comprise multiple memory devices that may be of different types) is used to store instructions, data, and the like.

License plate reader 200 can be a unit in the cloud, a unit in a user's device (e.g., PC, mobile phone, tablet, TV, etc), or a hybrid unit with some components in the cloud, others in a user's device, and others in intermediate devices such as gateways.

As mentioned above, the image to be processed may be received from a separate image capture device via the input interface 210, or it can be received from an image capture device integrated with the license plate reader 200. Alternatively, the image to be processed can be received via the same network used to transmit the combined image to the OCR unit, and the communications interface 230 can serve as the input interface to receive the image to be processed.

The combined image is transferred to the OCR unit via a network 260. In the preferred embodiment, the network 260 is the Internet, but as mentioned above the combined image can be transferred to the OCR unit via a local area network or a direct connection, which could be either a wireless connection or a wired connection such as fiber optic, coaxial, or some other type of cable. One skilled in the art would understand that there are various ways of inputting an image to the license plate reader or transferring a combined image to an OCR unit.

An OCR unit 270 receives the combined image via the network 260 and performs character recognition. As mentioned above, in the preferred embodiment Google's cloud-based OCR service is utilized as the OCR unit, but one skilled in the art would understand that other OCR units can be used.

Figure 3:
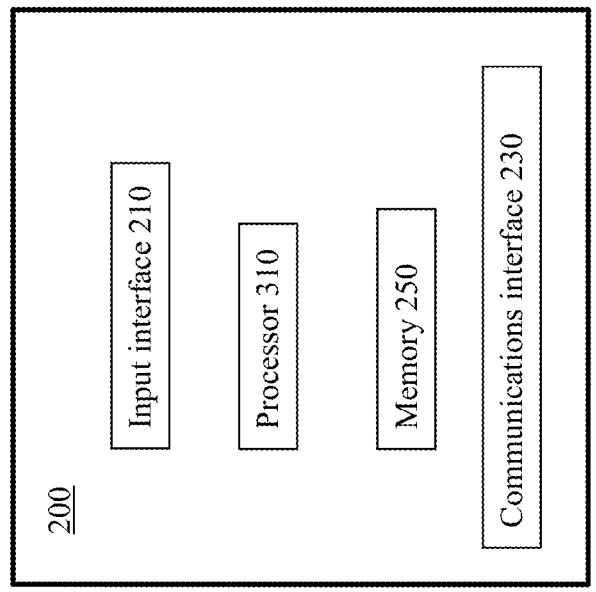
FIG. 3 shows a block diagram of an alternative arrangement of hardware components in accordance with the preferred embodiment of the invention.

FIG. 3 is an alternative block diagram illustrating components of the license plate reader 200. One skilled in the art would understand that a neural network can be implemented using one or more processors. FIG. 3 shows license plate reader 200 including a processor 310. Although a single processor 310 is illustrated, one skilled in the art would understand that functions can be shared by more than one processor. Also, one skilled in the art would understand that processor 310 (or additional processors, if used) can implement the functions of controller 240 (e.g., combining plural predicted license plate regions into a combined image and/or analyzing OCR results to determine the most frequently occurring character sequence) as well as the functions of a neural network performing the Faster-RCNN deep learning framework, or a separate controller or processor can be used.

A specific example of the preferred embodiment will be explained with reference to FIGS. 4-8.

Figure 4:
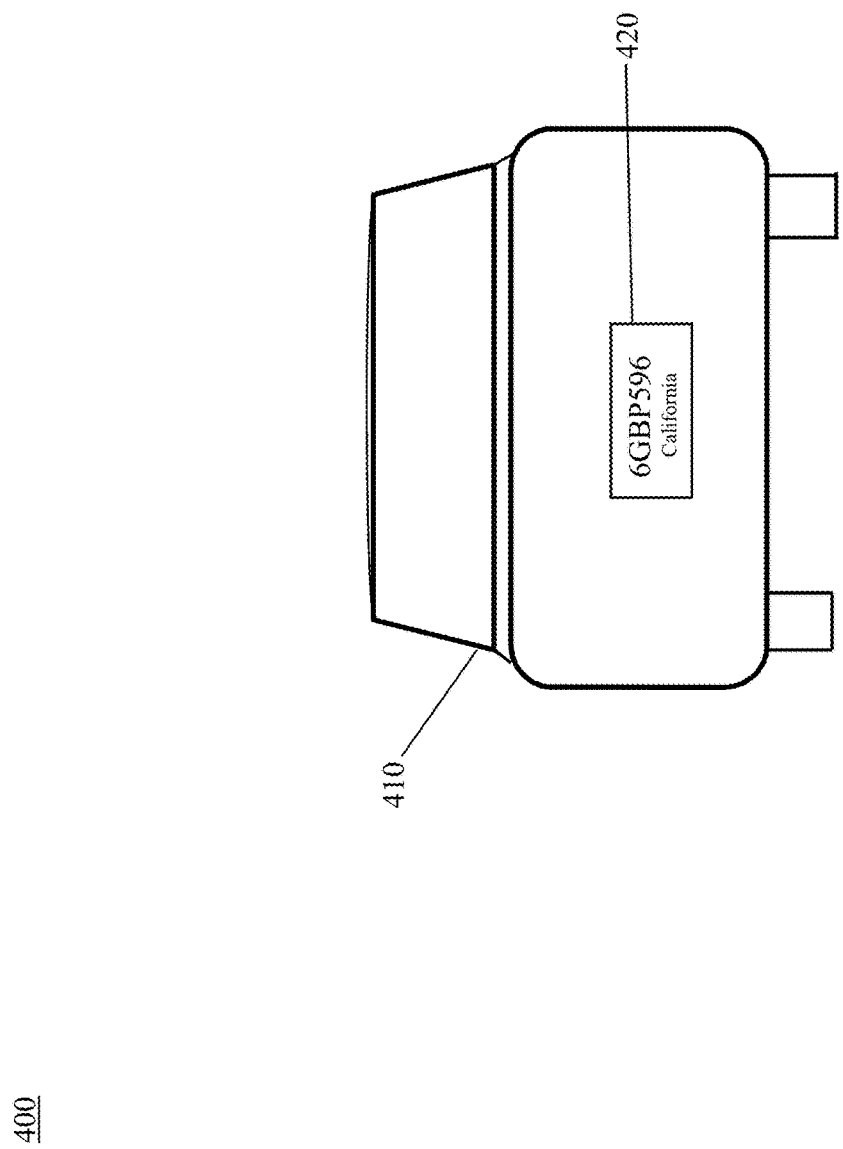
FIG. 4 depicts an example of an image including a vehicle having a license plate.
Figure 7:
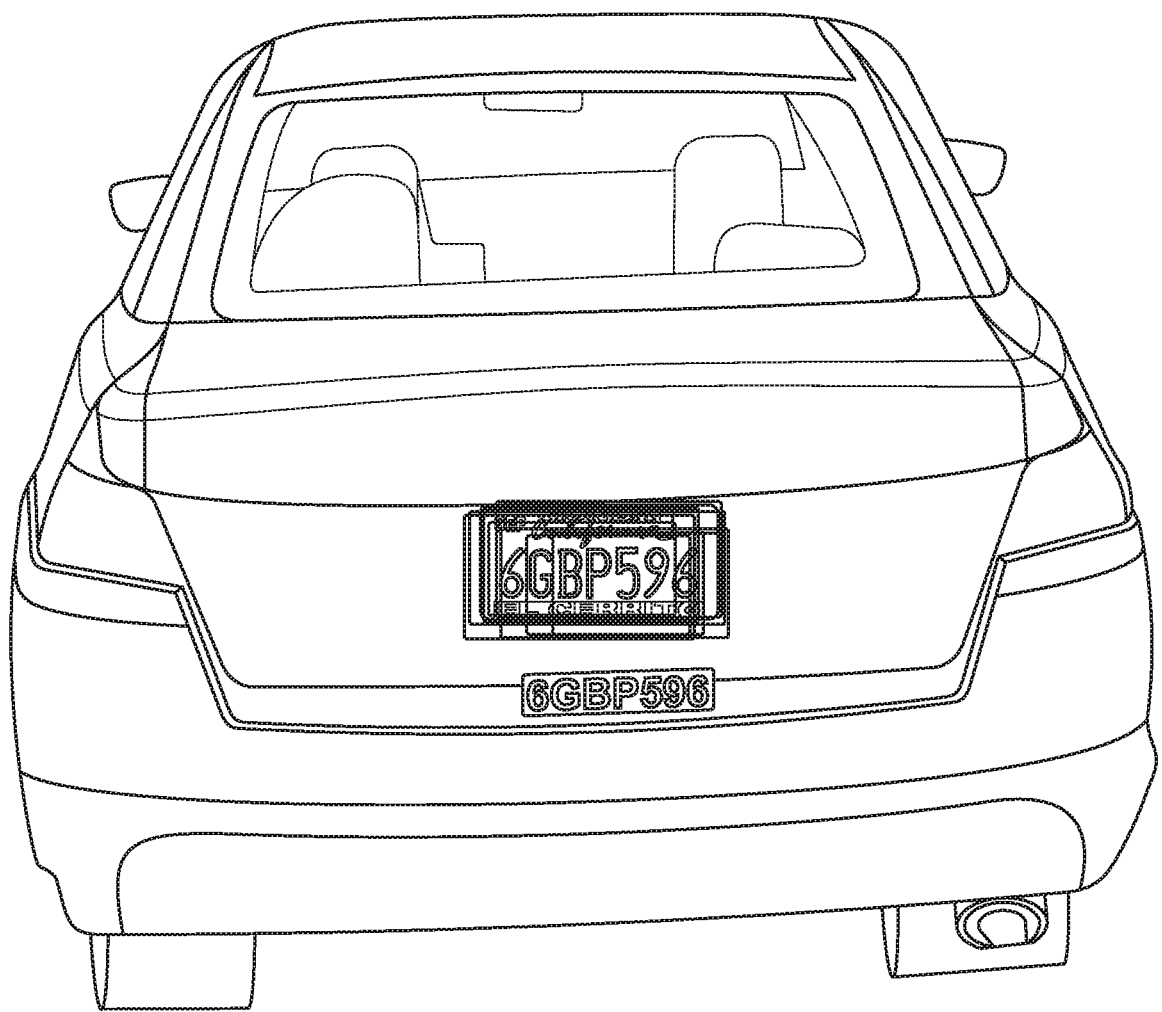
FIG. 7 shows an actual image including a vehicle with a license plate.

FIG. 4 depicts an image 400 containing a vehicle 410 having a license plate 420 with the character sequence 6GBP596. In this example, the state name "California" also appears on the license plate. (FIG. 7 shows an actual image of a vehicle having a license plate, whereas the image in FIG. 4 is depicted schematically.)

Figure 5:
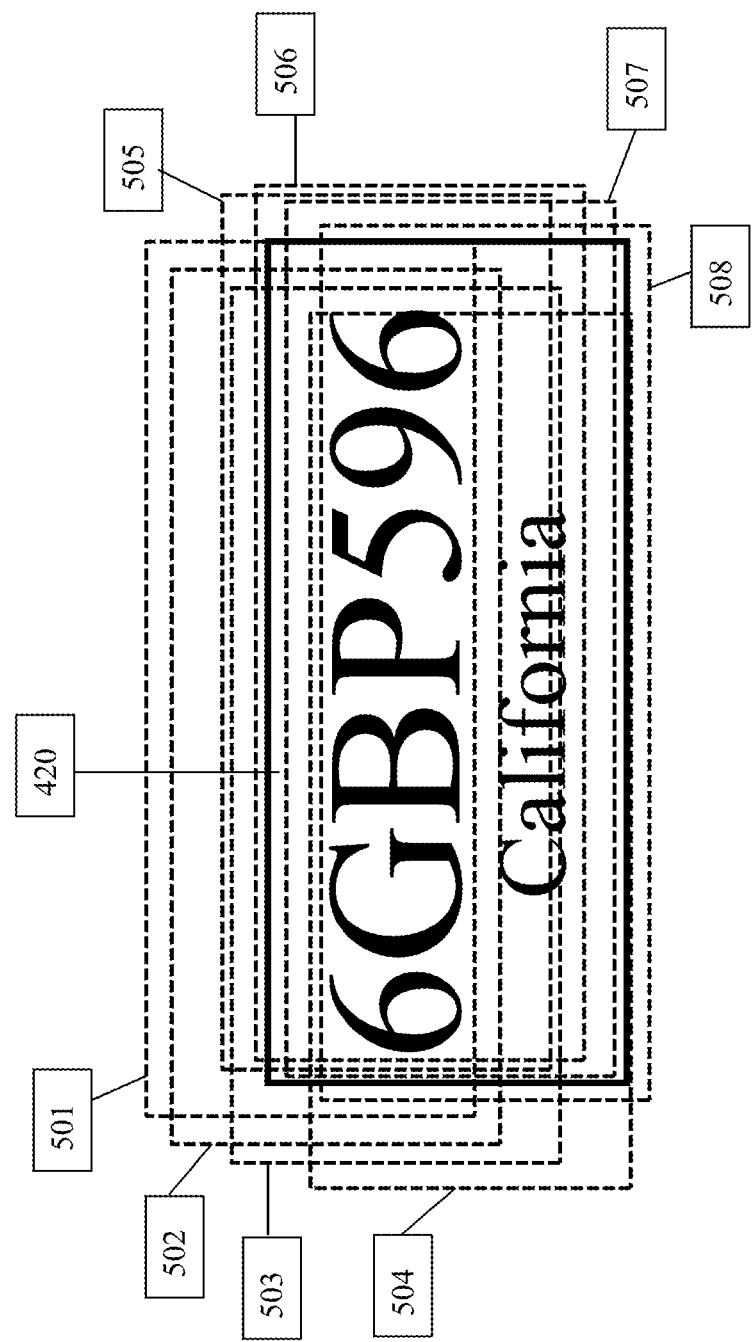
FIG. 5 depicts a plurality of predicted license plate regions surrounding an actual license plate region in an image.

FIG. 5 shows an enlarged view of the area in the image of FIG. 4 surrounding the license plate, with plural predicted license plate regions detected by the Faster-RCNN deep learning framework superimposed on the image. The plural predicted regions are labeled in FIG. 5 as 501, 502, 503, 504, 505, 506, 507, and 508. In this example, there are eight predicted regions (N=8), but a number of predicted regions that is higher or lower may be output by the network. The number of predicted regions determined by the neural network can depend on a variety of factors, including the angle of the camera taking the image, the lighting, and the proximity of the camera to the license plate.

As can be seen in the example of FIG. 5, the various predicted regions are overlapping, but they are offset from one another in the horizontal and/or vertical direction by varying amounts. Consequently, each predicted region can include the actual character sequence of the license plate in a different location relative to other predicted regions. Furthermore, each predicted region may contain varying portions of other text on the license place, such as the state name or text on the decorative license plate frame. Furthermore, each predicted region may fail to include the full character sequence of the license plate.

Figure 6:
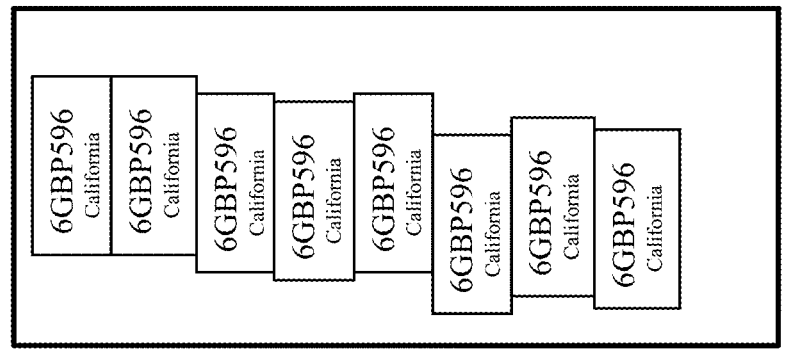
FIG. 6 depicts an example of a combined image in which a plurality of predicted license plate regions have been stitched together vertically.

FIG. 6 shows an example of the eight predicted regions after being combined into a single image. As mentioned above, in the preferred embodiment the various predicted regions are stitched together vertically into a single combined image. As shown in FIG. 6, since the various predicted regions are offset from one another, the license plate regions do not align in a straight vertical line when stitched together vertically. (FIG. 8 shows an actual combined image of plural predicted license plate regions detected in the image of FIG. 7.)

Figure 8:
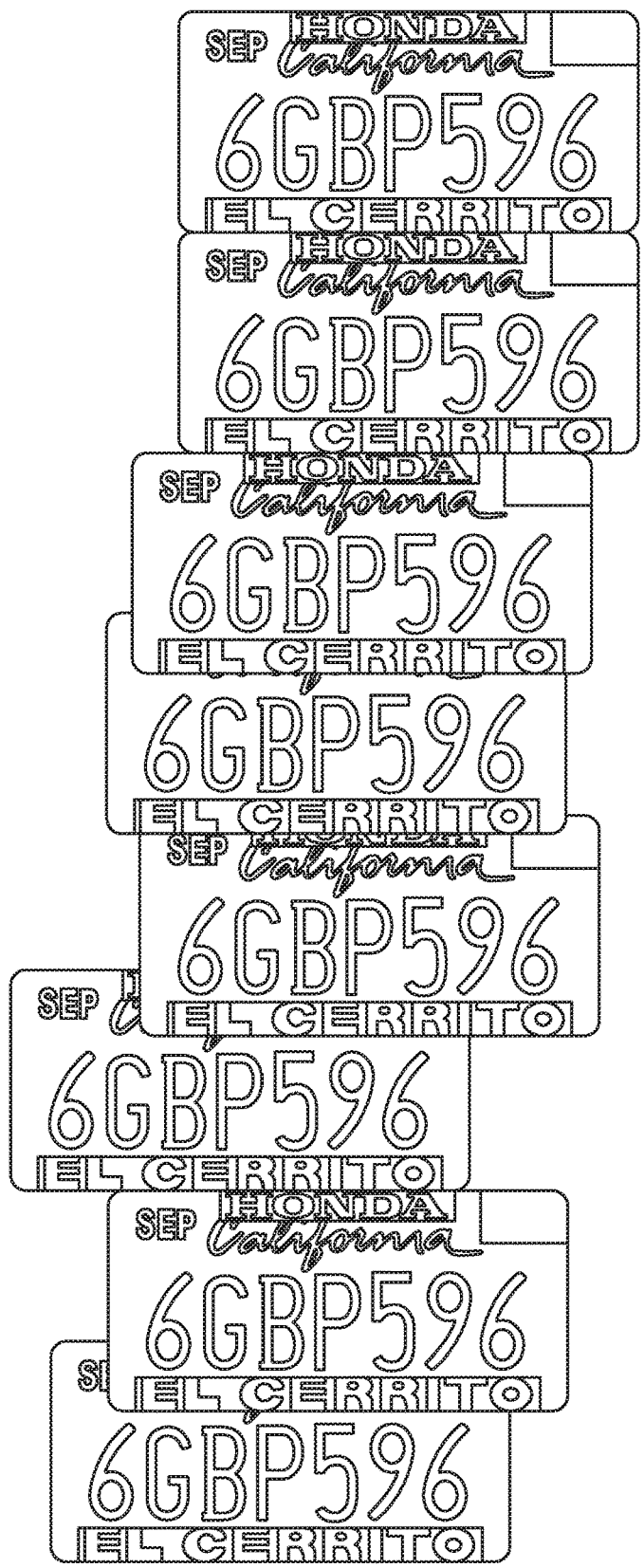
FIG. 8 shows an actual combined image in which a plurality of predicted license plate regions detected in the image of FIG. 7 are stitched together vertically.

When the combined image shown in FIG. 8 was input to Google's OCR, the output of Google's OCR contained the following four predicted character sequences (M=4):
6GBP596
6GBP526
6GBP596
6GBP596

Note that although eight predicted license plate regions were included in the combined image, in this case Google's OCR was not able to output a readable character sequence corresponding to each of the eight predicted regions. In this example, Google's OCR was able to output readable character sequences for four of the eight predicted regions contained in the combined image.

As can be seen above, in this example the correct character sequence was identified by Google's OCR in three of the four sequences. The second sequence above incorrectly includes a "2" instead of a "9." Upon analyzing the above OCR output results using the statistical approach of the preferred embodiment, the character sequence "6GBP596" is the most frequently occurring character sequence in the output results, and therefore that character sequence is determined to be the best estimate of the license plate character sequence in the image in this example. Hence, the character sequence of the license plate was correctly recognized.

Figure 9:
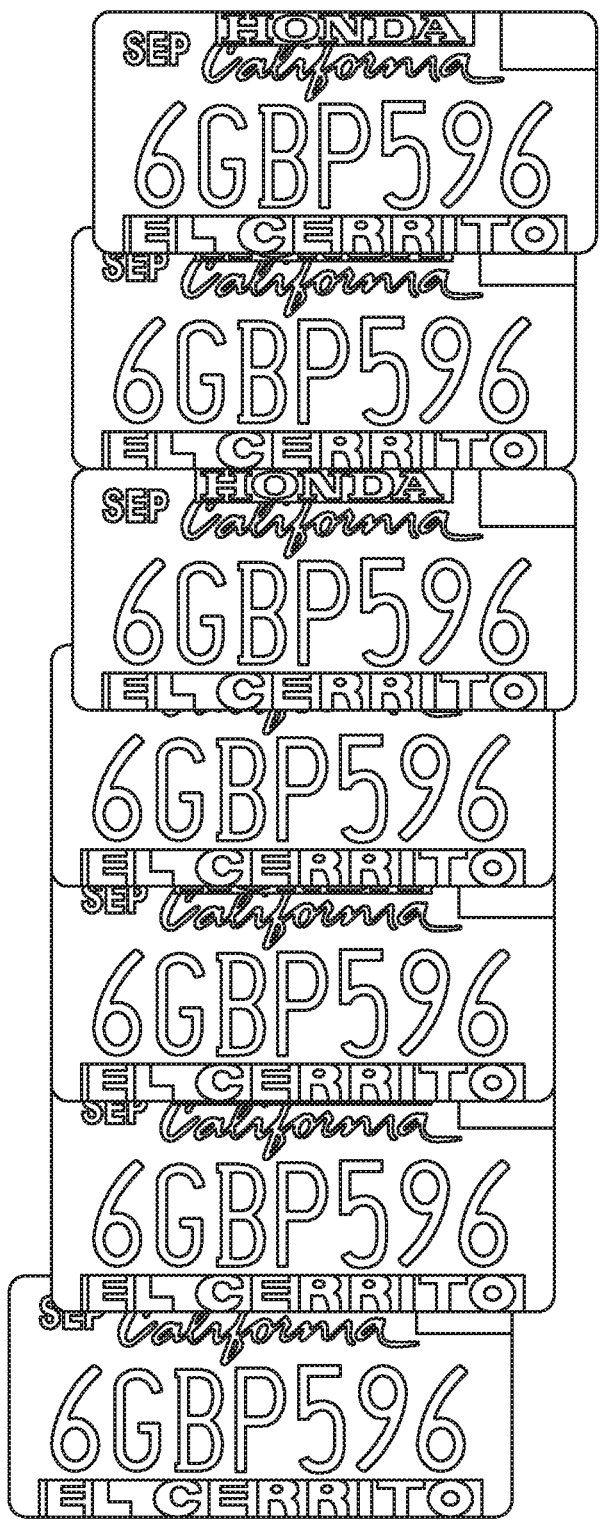
FIG. 9 shows an actual combined image in which a plurality of predicted license plate regions detected in another example image are stitched together vertically.

In another example, a different image of essentially the same scene including the same vehicle and license plate was used. In this other example, the neural network output a different number of predicted license plate regions than in the example above, namely, N=7. FIG. 9 shows the combined image including the plurality of predicted license plate regions obtained by the network for the image used in this example. The combined image shown in FIG. 9 was sent to Google's OCR and the following character sequences were output:
EONN
6GBP596
6GBP596
6GBP596
6GBP596
6GBP596
6GBP596
6GBP596
L CEBRE
EONER
EL SRBRE
L CEERE In this example, some of the recognized character sequences include characters that are not from the actual license plate characters, but rather come from additional text in the predicted regions (e.g., on the license plate frame rather than the license plate itself), so M=12 and in this case M>N. The preferred embodiment of stitching together multiple predicted regions into a combined image, performing OCR on the combined image, and using the most frequently occurring sequence as the output is able to produce a correctly recognized license plate character sequence in this example as well.

According to the above-described preferred embodiment, using the Faster-RCNN deep learning framework for license plate region detection, and performing OCR on a combined image including a plurality of predicted license plate regions, appears to provide more accurate detection and faster processing speed over conventional license plate readers. That is, the preferred embodiment uses highly accurate object detection (Faster-RCNN) and highly accurate OCR (Google's service) and determines a best estimate after using those techniques. Hence, the quality of the results is expected to surpass implementations that use older technologies and methods.

Those skilled in the art understand that a neural network is trained by providing it with examples of positive outcomes. For example, to train a neural network to identify regions within an image that contain a license plate, those skilled in the art would understand that images containing a license plate are input to the network the trainer would position a bounding box in the training image to indicate the shape and location of the license plate within the training image. In the preferred embodiment, the Faster-RCNN object detection neural network was trained for license plate region detection using an image database containing 1933 images. The network was then applied to 123 images with a single recognizable license plate. The neural network was able to make one or more predictions of the license plate region in 105 of the 123 images.

The OCR engine was able to predict the correct license plate characters in 71 of the 105 images with detected license plate regions, when multiple detected regions were stitched together into a single combined image and submitted for OCR, and the best estimate was determined by selecting the most frequently-occurring character sequence. When stitching was not used such that only the predicted region with the highest score amongst the set of plural predicted regions was submitted for OCR, correct license plate character predictions occurred in only 57 of the 105 images.

While various example embodiments have been described above, it should be understood that they have been presented by way of example, and not limitation. It is apparent to persons skilled in the relevant art(s) that various changes in form and detail can be made therein. Thus, the invention should not be limited by any of the above described example embodiments. Also, as used herein, the singular forms "a," "an," and "the," are intended to include the plural forms as well, unless the context clearly indicates otherwise.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures described herein need not be performed in the order presented.

We claim:

1. A license plate reader comprising:
   at least one memory storing instructions; and
   at least one processor that, upon executing instructions stored in the memory, controls the license plate reader to perform the functions of:
   receiving an image;
   determining a plurality of predicted license plate regions within the received image, the plurality of predicted license plate regions correspond to at least one license plate in the image such that the plurality of predicted license plate regions overlap with each other;
   transferring the plurality of predicted license plate regions to an optical character recognition unit that performs optical character recognition on the plurality of predicted license plate regions to output a plurality of predicted character sequences;
   receiving the output of the optical character recognition unit that contains the plurality of predicted character sequences; and
   determining the plurality of predicted character sequences to estimate a character sequence in the received image.

2. The license plate reader according to claim 1, wherein the at least one processor implements a Faster-RCNN (Region-based Convolutional Neural Network) network and the plurality of predicted license plate regions are determined using the Faster-RCNN network.

3. The license plate reader according to claim 1, wherein the license plate reader further performs the function of combining the plurality of predicted license plate regions into a single combined image, and wherein the single combined image is transferred to the optical character recognition unit to perform character recognition on the combined image.

4. The license plate reader according to claim 3, wherein the optical character recognition unit is external to the license plate reader, and the combined image is transferred to the optical character recognition unit via the Internet.

5. The license plate reader according to claim 3, wherein the plurality of predicted license plate regions are stitched together vertically to obtain the single combined image.

6. The license plate reader according to claim 1, wherein the estimate is determined by selecting a character sequence that occurs most frequently among the plurality of predicted character sequences.

7. The license plate reader according to claim 1, wherein the license plate reader further comprises an imaging unit and the processor receives the image from the imaging unit.

8. A license plate reader comprising:
   a neural network that determines a plurality of predicted license plate regions within an image, the plurality of predicted license plate regions correspond to at least one license plate in the image such that the plurality of predicted license plate regions overlap with each other; and
   a controller that controls the license plate reader to (i) transfer the plurality of predicted license plate regions to an optical character recognition unit that performs optical character recognition on the plurality of predicted license plate regions to output a plurality of predicted character sequences, (ii) receive the output of the optical character recognition unit that contains the plurality of predicted character sequences, and (iii) determine the plurality of predicted character sequences to estimate a character sequence in the image.

9. The license plate reader according to claim 8, wherein the neural network is a Faster-RCNN (Region-based Convolutional Neural Network) network.

10. The license plate reader according to claim 8, wherein the license plate reader further comprises an imaging unit and the neural network receives the image from the imaging unit.

11. The license plate reader according to claim 8, wherein the controller further causes the license plate reader to combine the plurality of predicted license plate regions into a single combined image, and to transfer the single combined image to the optical character recognition unit to perform character recognition on the combined image.

12. The license plate reader according to claim 11, wherein the optical character recognition unit is external to the license plate reader, and the combined image is transferred to the optical character recognition unit via the Internet.

13. The license plate reader according to claim 11, wherein the plurality of predicted license plate regions are stitched together vertically to obtain the single combined image.

14. The license plate reader according to claim 8, wherein the estimate is determined by selecting a character sequence that occurs most frequently among the plurality of predicted character sequences.

15. A method for reading a license plate, comprising:
receiving an image;
determining a plurality of predicted license plate regions within the received image, the plurality of predicted license plate regions correspond to at least one license plate in the image such that the plurality of predicted license plate regions overlap with each other;
transferring the plurality of predicted license plate regions to an optical character recognition unit that performs optical character recognition on the plurality of predicted license plate regions to output a plurality of predicted character sequences;
receiving the output of the optical character recognition unit that contains the plurality of predicted character sequences; and
determining the plurality of predicted character sequences to estimate a character sequence in the received image.

16. The method according to claim 15, wherein the determining comprises determining the plurality of predicted license plate regions using a Faster-RCNN (Region-based Convolutional Neural Network) network.

17. The method according to claim 15, further comprising combining the plurality of predicted license plate regions into a single combined image, and transferring the single combined image to the optical character recognition unit to perform character recognition on the combined image.

18. The method according to claim 17, wherein the combined image is transferred to the optical character recognition unit via the Internet.

19. The method according to claim 17, wherein the combining comprises stitching the plurality of predicted license plate regions together vertically to obtain the single combined image.

20. The method according to claim 15, wherein determining the estimate comprises selecting a character sequence that occurs most frequently among the plurality of predicted character sequences.

* * * * *